United States Patent [19]
Sham et al.

[11] Patent Number: 5,931,081
[45] Date of Patent: *Aug. 3, 1999

[54] ELECTRICAL DEEP-FRYER

[75] Inventors: John C. K. Sham, Hong Kong, The Hong Kong Special Administrative Region of the People's Republic of China; Kumkit KunavongVorakul, Bangkok, Thailand

[73] Assignee: Wing Shing Products (BVI) Co. Ltd., Aberdeen, The Hong Kong Special Administrative Region of the People's Republic of China

[*] Notice: This patent is subject to a terminal disclaimer.

[21] Appl. No.: 09/087,041

[22] Filed: May 29, 1998

Related U.S. Application Data

[63] Continuation-in-part of application No. 08/901,526, Jul. 28, 1997, Pat. No. 5,771,781.
[51] Int. Cl.$^6$ ....................................................... A47J 37/12
[52] U.S. Cl. .................................. 99/336; 99/348; 99/407; 99/409; 99/410
[58] Field of Search ....................... 99/330–336, 403–407, 99/408–417, 427, 348; 210/167, DIG. 8; 126/391, 219; 426/523

[56] References Cited

U.S. PATENT DOCUMENTS

| | | | |
|---|---|---|---|
| 4,852,471 | 8/1989 | Lansing | 99/330 |
| 4,901,633 | 2/1990 | De Longhi | 99/409 |
| 5,027,697 | 7/1991 | De Longhi | 99/409 |
| 5,771,781 | 6/1998 | Sham | 99/336 |

*Primary Examiner*—Timothy F. Simone
*Attorney, Agent, or Firm*—Salzman & Levy

[57] ABSTRACT

The present invention features an electrical, frying appliance that uniformly cooks food items placed within its food basket. This frying appliance automatically immerses and extracts the cooking basket into and out of an aluminum oil bowl containing heated oil. In this fashion, the food in the basket is uniformly fried during the cooking cycle. The frying appliance contains a translationally movable basket that operates by a transmission wire driven by a shaft. The translational movement of the food basket allows the food in it to lie flat as it is immersed in the aluminum oil bowl. The food basket remains substantially horizontal during its movement between its immersed and non-immersed positions. In this fashion, the food items are prevented from shifting around in the frying basket. This allows the food to fry evenly within the basket and, when cycled, to be drained of oil periodically. The shaft mechanism that moves the food basket is directly powered by a motor that is offset from the aluminum oil bowl housing, allowing for a cooler, operational motor temperature.

28 Claims, 6 Drawing Sheets

ELECTRICAL DEEP-FRYER

This is a continuation-in-part of application Ser. No. 08/901,526 filed on Jul. 28, 1997 now U.S. Pat. No. 5,771,781.

FIELD OF THE INVENTION

The present invention pertains to electrical cooking appliances and, more particularly, to an electrical deep-fryer that provides both automatic, cyclic immersion and extraction of the food basket and its contents into and out of heated oil while in an aluminum oil bowl. The automatic immersion causes the food basket to rise up and down and stop at an indicated location.

BACKGROUND OF THE INVENTION

Automatic, oil-frying machines are popular home appliances today. However, many of these oil fryers have been known to cook the contents of their baskets unevenly. Additionally, many fried items retain too much oil and, when removed from the fryer, remain greasy and generally unwholesome.

The present invention reflects the discovery that foods that are periodically immersed and removed from a fryer during the cooking cycle become more evenly cooked, and tend to retain less oil after the cooking cycle is terminated.

A particular type of frying apparatus provides a tilting, rotating basket in order to periodically convey food items through heated oil. Such a machine is illustrated in U.S. Pat. Nos. 4,901,633 and 5,027,697, which were both issued to DE LONGHI on Feb. 20, 1990 and Jul. 2, 1991, respectively, both of which were entitled "Rotating Oblique Basket Frier for Cyclic Immersion Cooking". The aforementioned apparatus cyclically moves the food in the basket in and out of the heated oil, as the basket is caused to rotate in a tilted position.

Several problems are associated with this type of basket fryer. In the first place, the rotative drive motor is disposed below the heated oil pan, in close proximity to the heated oil. The motor must be carefully sealed so as to prevent oil leakage into the motor housing. Since it is so close to the oil, the motor must be designed to run hot, yet be sufficiently insulated to prevent overheating of its parts. In addition to these operational problems, the food cooking is often uneven, despite the rotation of the basket into and out of the heated oil. Items such as puff balls, fritters and other, generally round items may tend to roll back into the oil, as the tilted basket is rotated. In addition, some items are disposed within the oil longer, because of their size and/or shape, thus causing an unevenness in the entire, cooked contents of the rotating basket.

The present inventor has determined that, in order to provide uniform frying of food items in an electrical deep-fryer, it is advantageous to have the food basket automatically rise up and down and stop in an indicated location. Then the food basket is immersed into the heated oil in a uniform, translational manner. Using translational motion ensures that all of the food items in the basket meet and leave the heated oil at approximately the same time. The translational motion also ensures that none of the items in the food basket will shift during the cooking cycle.

The current invention encompasses the development of an automatic movable food basket for a deep-frying appliance. This automatic movable food basket has a power supply that is controlled by a number of conductors.

It is an object of the present invention to provide an improved, electrical, frying appliance.

It is another object of this invention to provide an electrical, deep-frying appliance that automatically immerses and extracts food items from an aluminum oil bowl during a cooking cycle by using a number of switches.

It is still another object of the present invention to provide an electrical fryer that is less subject to fouling than are conventional appliances.

It is still another object of the present invention to provide an electrical frying appliance that uniformly cooks foods.

It is still another object of the present invention to provide an electrical fryer that uses a timer to control the food basket to continuously rise up and move down while the food is fried intermittently.

It is a further object of this invention to provide an electrical fryer that uses a timer to control the food basket to rise up and move down after continuously frying the food.

SUMMARY OF THE INVENTION

In accordance with the present invention, there is provided an electrical frying appliance that uniformly cooks food items disposed within its food basket. The frying appliance automatically immerses and extracts the food basket into and out of an aluminum oil bowl. Thus, the food in the inventive food basket is more uniformly fried during the cooking cycle than food fried in conventional appliances. The inventive frying appliance comprises a translationally movable basket that is supported by a transmission stand that is driven by a shaft connected to a motor. The translational movement of the basket allows the food disposed therein to lie flat as it is immersed in the aluminum oil bowl. That is, the food basket remains substantially horizontal during its movement between its immersed and non-immersed positions. In this fashion, the food items are prevented from shifting around in the food basket. This allows the food to fry evenly therein and, when cycled, to be periodically drained of oil.

The shaft from the motor is directly connected to the food basket that is driven by triggering the power supply of the whole unit which is controlled by a switch. The motor, offset from the aluminum oil bowl housing, allows for a cooler, operational motor temperature. The motor is thus less subject to heated oil vapors and oil leakage that is usually associated with motors disposed at the side of the aluminum oil bowl housing. The motor of the inventive fryer is offset from the aluminum oil bowl, and is protected from heated oil vapors by a retaining wall of the cooking chamber and an aluminum shield. Accordingly, the motor of the invention experiences less fouling by grease and oil during its frying lifetime than do comparative conventional frying appliances.

BRIEF DESCRIPTION OF THE DRAWINGS

A complete understanding of the present invention may be obtained by reference to the accompanying drawings when considered in conjunction with the subsequent, detailed description, in which.

For purposes of clarity and brevity, like elements and components will bear the same designations and numbers throughout the above figures.

DESCRIPTION OF THE PREFERRED EMBODIMENT

Generally speaking, the invention features an electrical, deep-frying appliance that cooks food uniformly. The frying appliance features a translationally movable food basket, which allows for the automatic, cyclic immersion and extraction thereof, along with its food contents, into and out of a heated aluminum oil bowl. The translational movement of the basket ensures that food disposed therewithin does not shift during the immersion and extraction cycles.

Figure 1:
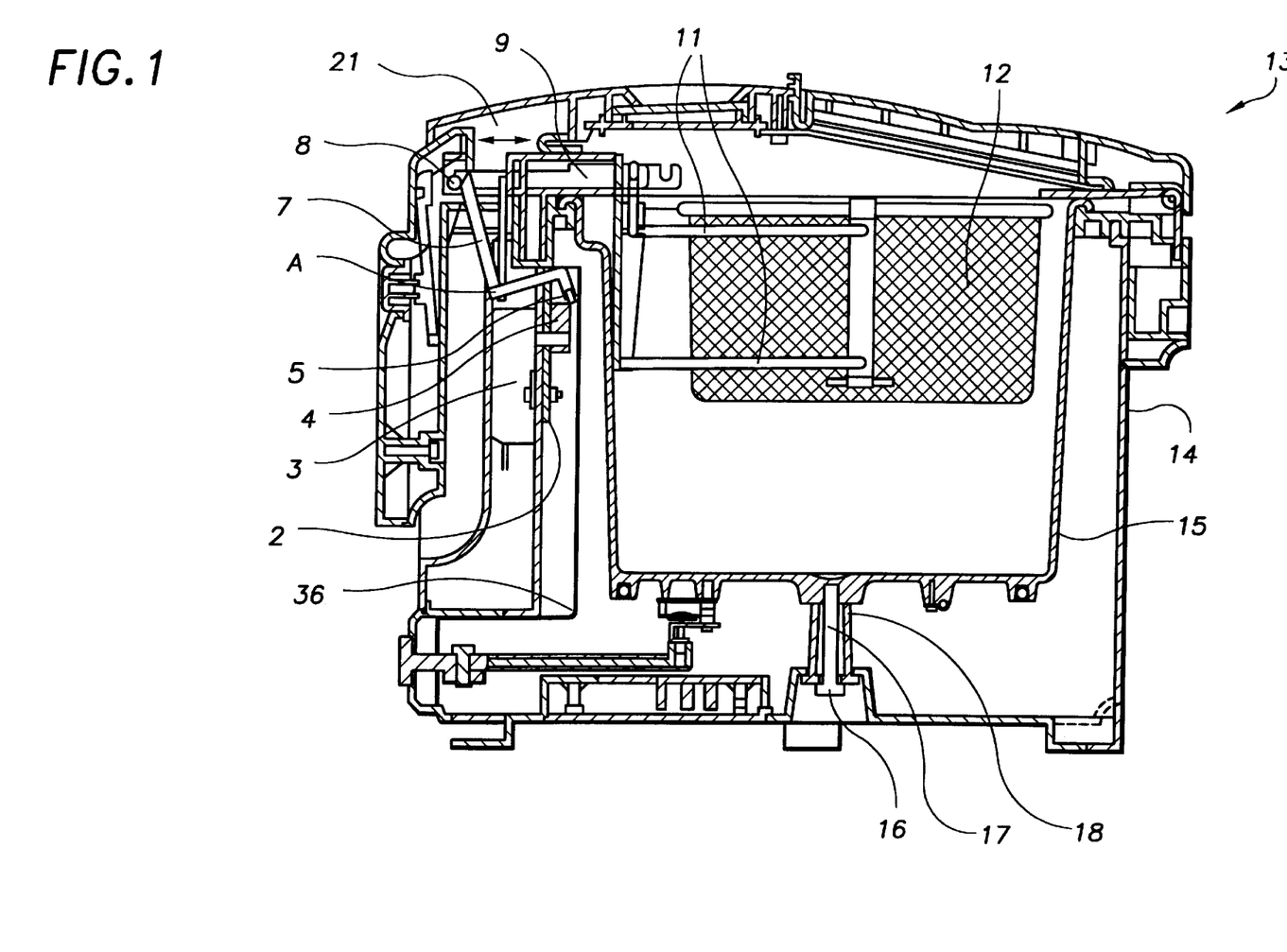
FIG. 1 illustrates a front, sectional view of the electrical, deep-frying appliance of this invention, with its food basket disposed in its "up", or extracted, position.

Now referring to FIG. 1, an electrical, deep-frying appliance 13 is illustrated. The appliance 13 comprises a fryer housing 14, which contains a food basket 12. The food basket 12 is disposed within an aluminum oil bowl 15. The aluminum oil bowl 15 is mounted for rotation upon a spindle 17 that is rotationally anchored to the bottom of the fryer housing 14 by nut 16, through hollow bore 18.

The food basket 12 is shown in an upper, extracted position with respect to the aluminum oil bowl 15. In operation, when a user turns a switch 2 in an counter-clockwise direction, motor 3 rotates, as indicated by a lamp 3. As the motor 3 rotates, a cam 4 also rotates and a lever 7 swings about lever point A. A gyro wheel 5 slides over the cam 4 to reduce friction during rotation. In order for the food basket 12 to rise up automatically, the cam 4 must rotate to its highest point. Then lever 7 swings to the left and pushes a pin 8 to the left. As a result, a transmission 9 moves to the left and the transmission wire 11, having transmission wires 11a and 11b, rotates counter-clockwise about the lever 7 so the food basket 12 is raised up to its highest point.

Figure 3:
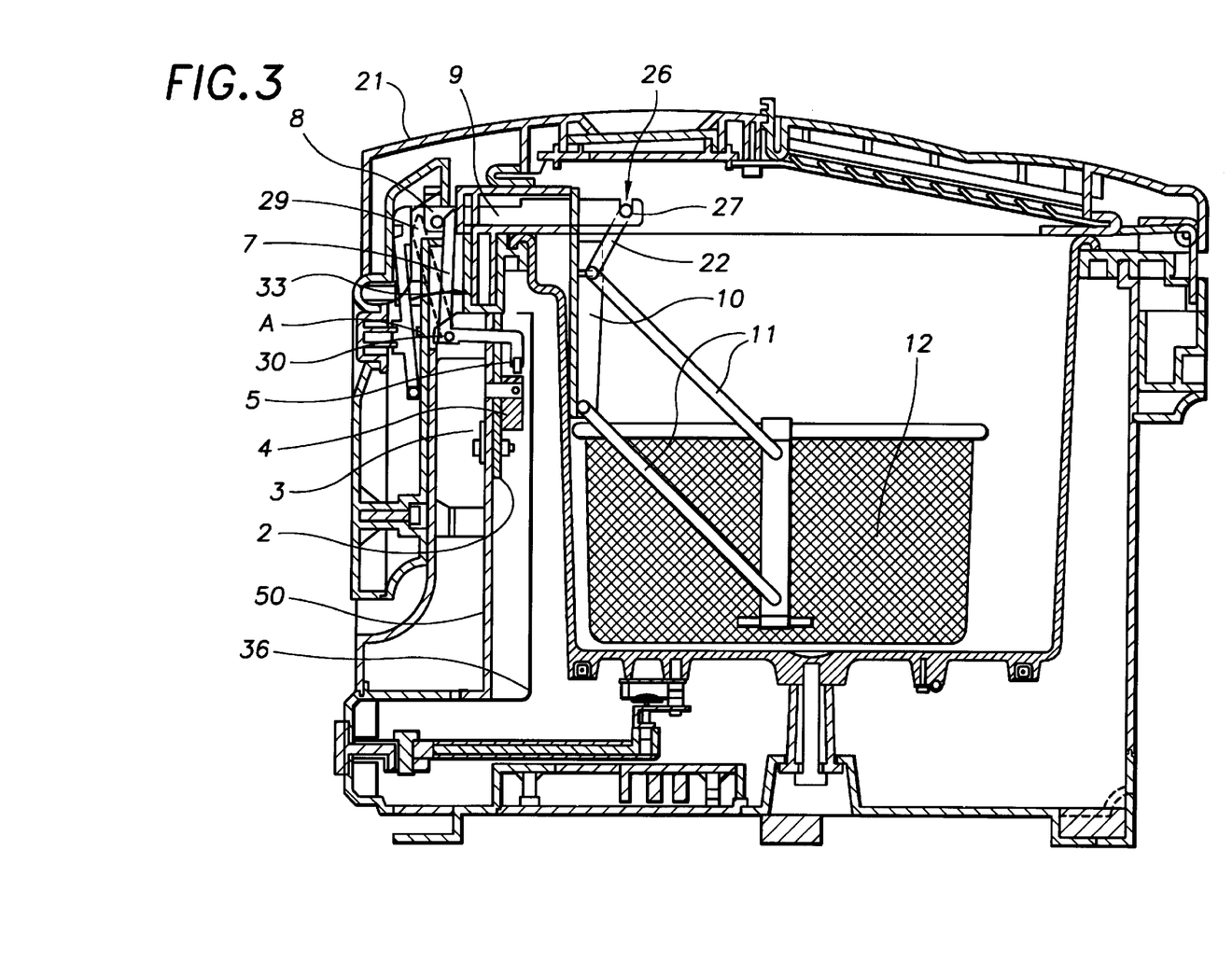
FIG. 3 shows the electrical, deep-frying appliance illustrated in FIG. 1, with its food basket disposed in its lower position, immersed in oil.

Referring to FIG. 3, the electrical, deep-frying appliance 13 is shown in enlarged detail. Extension arm 22 of link 11a is movably anchored in slot 26 of the slidable rod 9. The end 27 of the extension arm 22 comprises a round pin (not shown) that rides within slot 26 and follows the horizontal motion (arrows 21) of the slidable rod 9. The movement (arrow 21) of the slidably reciprocal rod 20 is imparted to the rod by a pivot link 29 that pivots about pivot point 30. The pivot link 29 is shown in this view in both solid and phantom views. The solid view is its position in FIG. 3; the phantom view represents its position in FIG. 1. An upper portion 28 of the pivot link 29 rests against a fixed pin 8 that is anchored to the rod 9. The pivot link 29 moves from the angled position (FIG. 1) to the nearly vertical position (FIG. 3), as shown by arrow 33. The pivotable movement of pivot link 29 in a clockwise direction (arrow 33) causes the rod 20 to move to the right under its spring biasing, and causes the food basket 12 to descend into the aluminum oil bowl housing 15.

Figure 2:
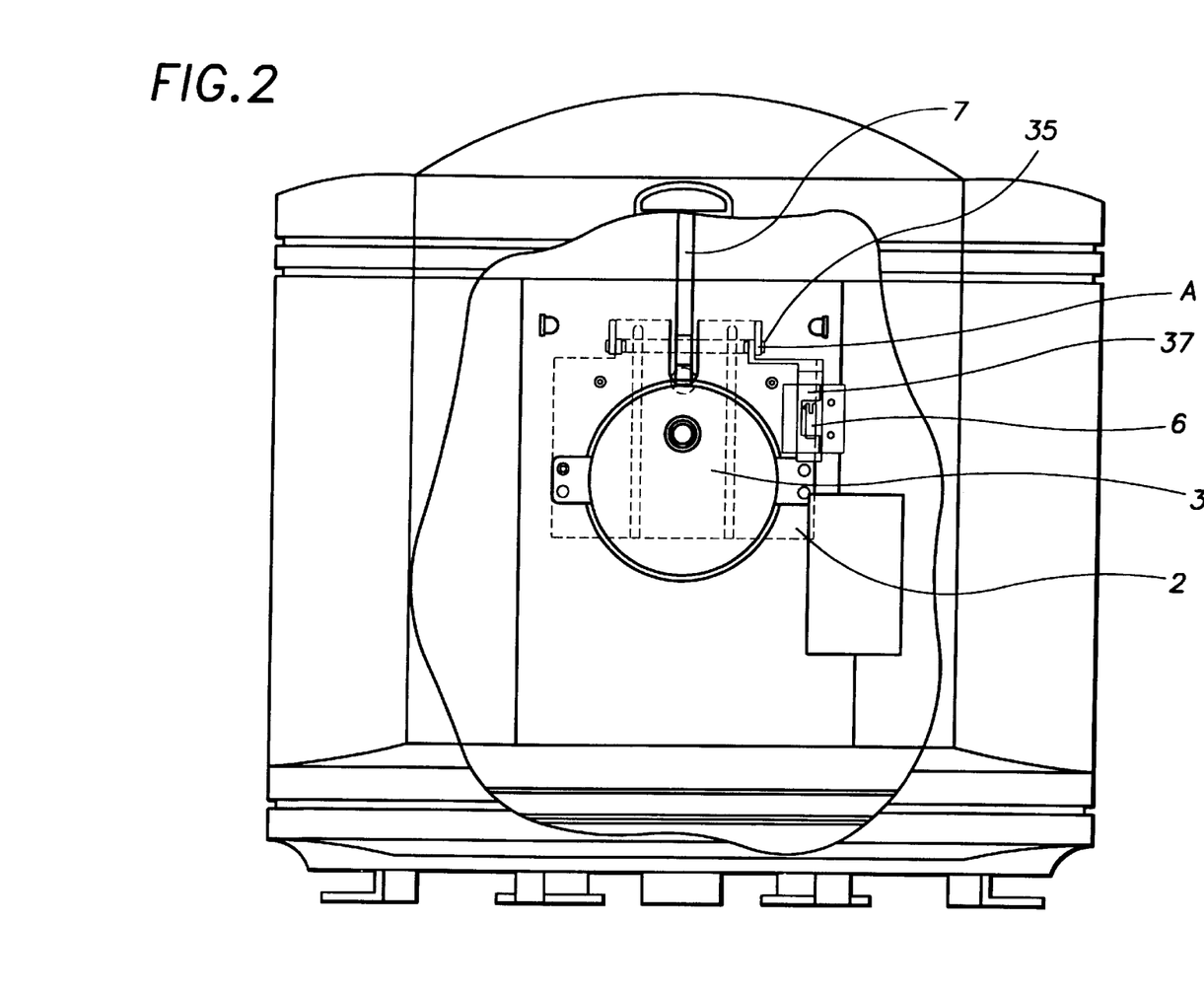
FIG. 2 depicts a side, internal view of the drive mechanism of the electrical, deep-frying appliance shown in FIG. 1, with the drive mechanism positioned for the frying basket in its "up", or extracted, position.
Figure 4:
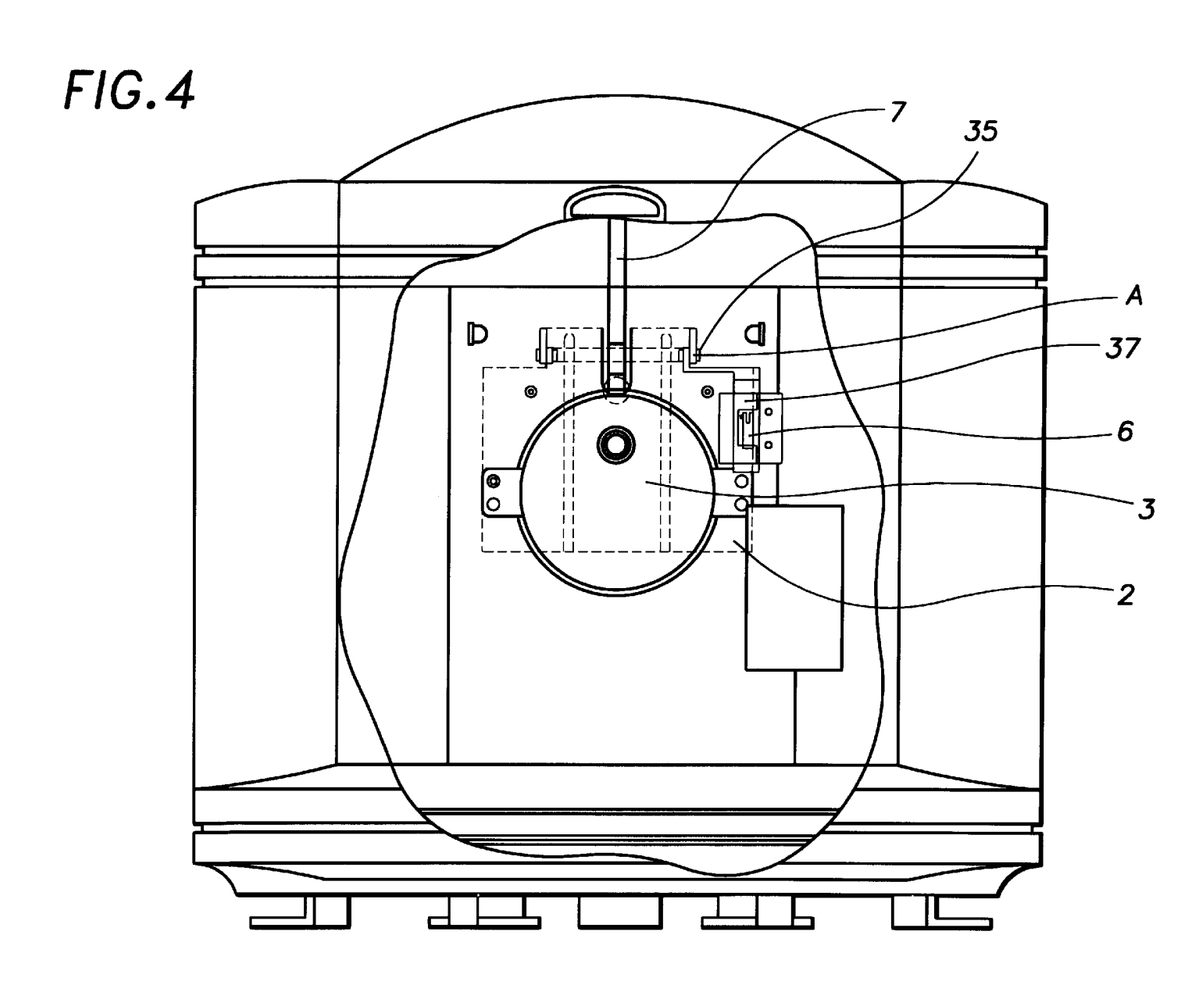
FIG. 4 illustrates the drive mechanism shown in FIG. 2 in a position corresponding to the immersion position of the food basket shown in FIG. 3.

The pivot 30 about which pivot link 29 is caused to rotatively pivot comprises a shaft 35, to which the pivot link 29 is fixedly attached, as better observed with reference to FIGS. 2 and 4.

Referring to FIGS. 2 and 4, a shaft 35 is depicted. FIG. 2 represents the positions of the shaft 35 with respect to the upper basket position, as shown in FIG. 1. FIG. 4 depicts the shaft position with respect to the lower basket position, as illustrated in FIG. 3. As aforementioned, the pivot link 29 that is fixedly attached to shaft 35 at pivot point 30, is caused to pivot as the shaft 35 is caused to rotate. The shaft 35 is rotatively driven by the motor 3. The shaft 35, in turn, rotatively drives the link 29 into the moving rod 20.

The switch push plate 37 periodically comes into contact with switch 2, as shaft 35 is caused to turn. Switch 2, which is normally open, is closed by the contact with the switch push plate 37 as the cam 4 rotates. Switch 2 controls the movement of the food basket 12 from its upper, retracted position to its lower, immersed position within the aluminum oil bowl housing 15. The description of the electrical controls, of which switch 2 is an integral part, is explained further hereinafter with respect to FIG. 5.

Referring again to FIGS. 1 and 3, motor 3 is considerably offset to the left of the aluminum oil bowl 15. The motor 3 is insulated from the aluminum oil bowl 15 by an insulative retaining wall 50 and an aluminum shield 36. These two features of the design allow the drive mechanism to run freely, to prevent fouling by heated oil vapors, and keep the drive mechanism operatively cool.

Figure 5:
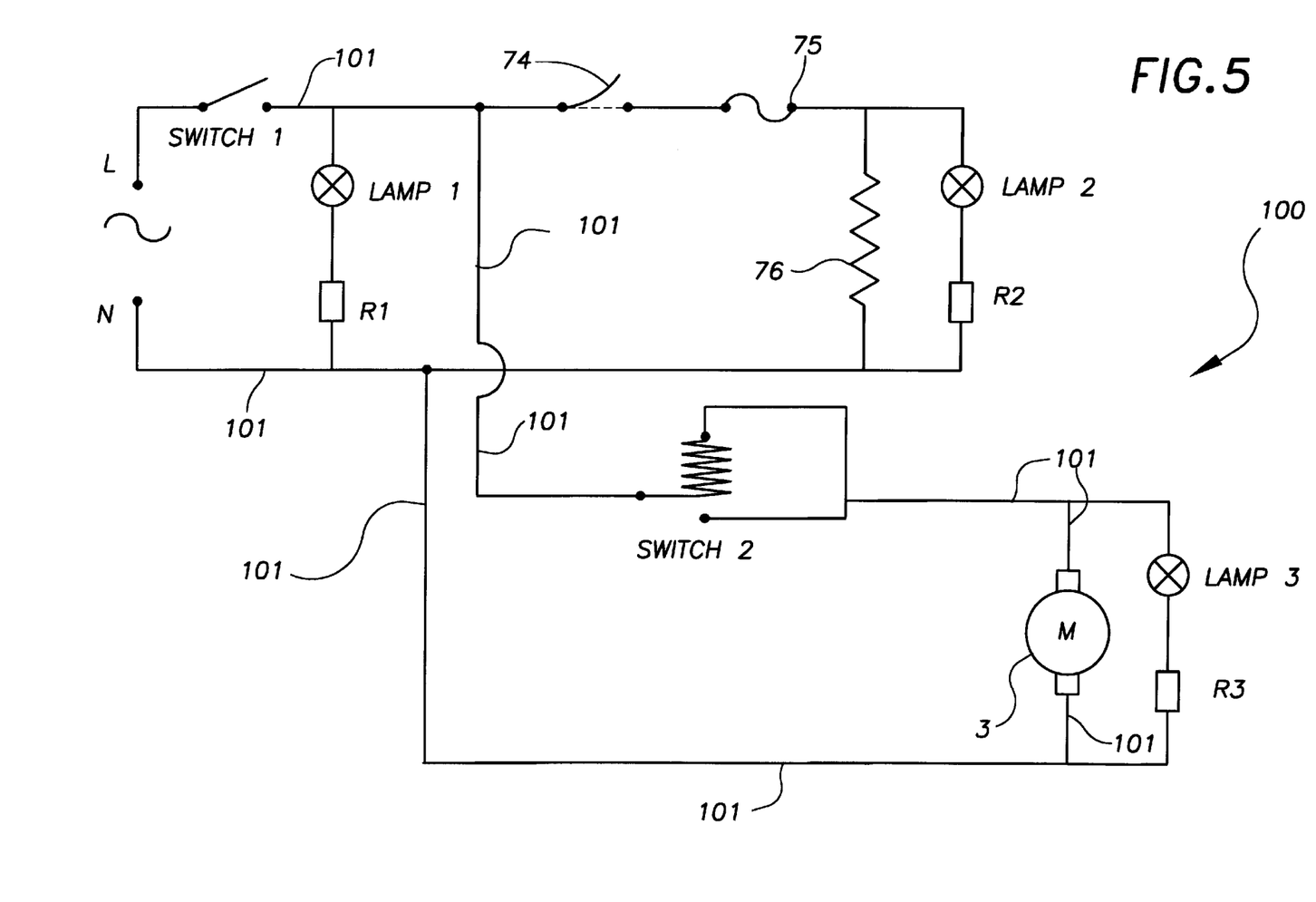
FIG. 5 depicts the electrical circuit for electrically actuating and operating the deep-frying appliance shown in FIGS. 1 through 4.

Referring to FIG. 5, the electrical circuit 100 of the deep-frying appliance 13 of this invention is shown. The circuit 100 allows the frying appliance 13 to operate in several different modes. The fryer appliance 13 can operate in an automatic, cyclic mode, wherein the food basket 12 can automatically descend into and rise from the oil bowl housing 15. When switch 2 is pushed downwardly, away from its spring biasing, a short circuit of the sub-circuit 101 occurs. This causes motor 3 to energize, and begin to operate continuously, thus causing the food basket 12 to cycle between its upper and lower positions.

At the beginning of the operative, cooking cycle, the food basket 12 may be caused to descend automatically into the aluminum oil bowl housing 15. When cam 4 rotates to the lowest position, lever 7 swings to the right and it pushes the pin 8 to the right. As a result, the transmission 9 moves to the right and transmission wire 11 rotates clockwise about the lever 7. The food basket 12 is moved down to the lowest position. When the food basket 12 reaches the desired position and the knob of the switch 2 is released, the turning knob 28 returns to the OFF position. Then motor 3 stops. The food basket 12 stops at that position as the turning knob 28 is released.

Switch 1 is pushed to start the cooking cycle and to furnish power to the sub-circuit 101. Lamp 1 lights, indicating that the cooking cycle is initiated.

Lamp 2 lights when power is furnished to the heater 76, which is used to heat the aluminum oil bowl 15. The thermostat 74 and thermofuse 75 automatically control the normal temperature and safety temperature, respectively, used by heater 76.

Figure 6:
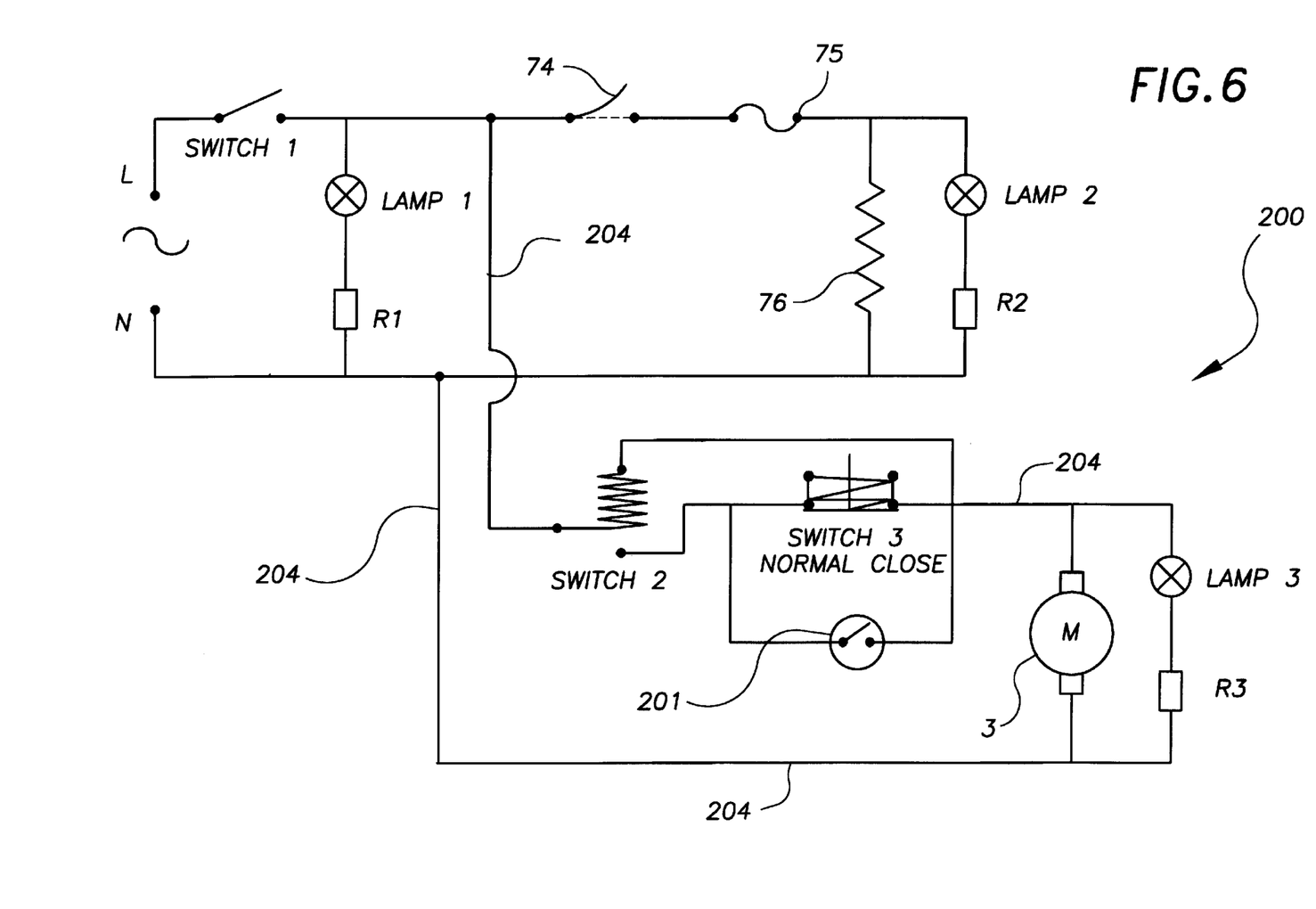
FIG. 6 shows an alternate embodiment for the electrical circuit illustrated in FIG. 5.

Referring to FIG. 6, an alternate embodiment is shown for the circuit 100 illustrated in FIG. 5. The alternate circuit 200 allows the food basket 12 to cycle between the upper and lower positions continuously. The user turns the knob of switch 2 clockwise and turns the timer 201 to close the circuit 200. The motor 3 rotates as indicated by a lamp 3. As the motor 3 rotates, the cam 4 also rotates and the lever 7 swings about the lever point A. As mentioned above, cam 4 continuously rotates and the lever 7 also sways to the left and to the right, alternatively. This motion pushes pin 8 to move to the left and to the right. The transmission 9 moves to the left and to the right so as to rotate the transmission wires 11a, 11b clockwise and counter-clockwise. As a result, the food basket 12 is raised up and moved down continuously. As the food basket 12 rises up and moves down, the food inside food basket 12 can be fried intermittently. When the timer 201 stops, the circuit 200 of the elevator switch 6 is still closed until the food basket 12 rises up to its highest position and completes the circuit of the elevator switch 6. Motor 3 stops and the food basket 12 is located at its highest position so that food can be extracted preparatory to another frying cycle.

As aforementioned, the movement of the food basket 12 is indicated by lamp 3. The constant cycling of the food basket 12 causes food to fry intermittently during the timed cycle. This intermittency and the horizontal immersion of the food basket allow the food to drain periodically, thus providing a fried product that, on average, comprises less retained cooking oil, and which is more uniformly fried.

The food is less greasy and tends to have a more uniform cooking appearance and uniform taste throughout. Comparative tests with other commercial fryers were conducted in order to measure the amount of retained cooking oil. It was shown that this invention produced fried foods that were consistently lighter in weight than were foods fried in other fryers that did not horizontally immerse the food into the oil. This proved that less oil was retained in the final product. Test results illustrating the retained oil are shown in Column D of Table I, below.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A frying appliance that comprises a food basket that is moveable between an upper, non-immersed, oil bowl position and a lower, immersed, oil bowl position, said frying appliance comprising:

a housing supporting a moveable food basket and a stationary oil bowl disposed adjacent said food basket, said oil bowl having means for receiving and heating oil for frying food disposed in said food basket;

a translational mechanism connected to said food basket for moving said food basket between an upper, non-immersed, oil bowl position to a lower, immersed, oil bowl position, wherein said foods disposed in said food basket are cooked in heated oil disposed in said oil bowl, said translational mechanism allowing said food basket to remain substantially horizontal during said movement between its upper and lower positions; and drive means operatively connected to said translational mechanism for driving said translational mechanism between said upper, non-immersed, oil bowl position to said lower, immersed, oil bowl position.

TABLE I

Deep Fry-Food Fried Testing Records
General requirement

| Food | Weight | Temperature | Time |
| --- | --- | --- | --- |
| Chicken leg | 300 gm | 160 deg C | 20–25 min |
| Pork | 350 gm | 160 deg C | 6 min |

Data Records

| No | Food | Food temp | weight before fried | weight after fried | temperature variation | time | results |
| --- | --- | --- | --- | --- | --- | --- | --- |
| 1 | Chicken leg | 10 deg C | 560 gm | 385 gm | 146.9–113 deg C | 20 min | well cooked |
| 1A | Chicken leg | 10 deg C | 500 gm | 360 gm | 153.5–121 deg C | 20 min | well cooked |
| 2 | Chicken wing | 10 deg C | 230 gm | 130 gm | 160.5–148 deg C | 12 min | well cooked |
| 2A | Chicken wing | 10 deg C | 330 gm | 200 gm | 159–139 deg C | 13 min | well cooked |
| 3 | Pork | 20 deg C | 300 gm | 170 gm | 163.2–146.8 deg C | 5 min | well cooked |
| 3A | Pork | 20 deg C | 360 gm | 210 gm | 163.2–130.1 deg C | 5 min | well cooked |
| 4 | Pork | 20 deg C | 190 gm | 110 gm | 163.2–146.8 deg C | 5 min | |
| 4A | Pork | 20 deg C | 260 gm | 160 gm | 163.2–130.1 deg C | 5 min | nearly cooked, fuse tural |

It will be observed that the foods fried by competitive fryers, designated 1a, 2a, 3a, and 4a, respectively, weighed many grams more than those foods fried by the inventive apparatus. Thus, the competitively fried food retained greater amounts of cooking oil.

In addition, the timer 201 can be used to control the food basket 12 to rise up and move down after continuously frying the food. When the circuit 204 to the timer 201 is closed, the food basket 12 moves down to its lowest position and stops to allow for continuous frying. As the time of frying is completed, the circuit 204 to the timer 201 is opened. The food basket 12 is raised to its highest point and stopped at that position for food extraction.

2. The frying appliance in accordance with claim 1, wherein said translational mechanism comprises two substantially parallel transmission wires pivotally connected to said food basket and pivotally disposed with respect to said housing.

3. The frying appliance in accordance with claim 2, wherein said drive means comprises a shaft for causing said two, substantially parallel transmission wires to pivot with respect to said housing, causing said food basket to move relative thereto.

4. The frying appliance in accordance with claim 3, wherein said drive means further comprises a drive motor operatively connected to said shaft for rotatively driving said shaft.

5. The frying appliance in accordance with claim 4, wherein said drive means further comprises a switch, a rotative cam that is rotatable with said shaft, and an electrical circuit for powering said drive motor, said cam actuating said switch to control said electrical circuit in order to feed power to said drive motor.

6. The frying appliance in accordance with claim 4, wherein said drive means is disposed in an offset position with respect to said oil bowl.

7. The frying appliance in accordance with claim 4, wherein said drive means is insulatively separated from said oil bowl.

8. The frying appliance in accordance with claim 5, wherein said electrical circuit further comprises a timer switch that feeds power to said drive means continuously, whereby said food basket automatically cycles in and out of said oil bowl continuously for a predetermined time.

9. A frying appliance that comprises a food basket that is moveable between an upper, non-immersed, oil bowl position and a lower, immersed, oil bowl position, said frying appliance comprising:

a moveable food basket for receiving items to be fried;

a stationary oil bowl disposed adjacent said food basket, said oil bowl having means for receiving and heating oil for frying said items disposed in said food basket;

a translational mechanism connected to said food basket for moving said food basket between an upper, non-immersed, oil bowl position to a lower, immersed, oil bowl position, wherein said items disposed in said food basket are cooked in heated oil disposed in said oil bowl, said translational mechanism allowing said food basket to remain substantially horizontal during said movement between its upper and lower positions; and drive means operatively connected to said translational mechanism for driving said translational mechanism between said upper, non-immersed, oil bowl position to said lower, immersed, oil bowl position.

10. The frying appliance in accordance with claim 9, further comprising a frame for supporting said oil bowl, and wherein said translational mechanism comprises two substantially parallel transmission wires pivotally connected to said food basket and pivotally anchored to said frame.

11. The frying appliance in accordance with claim 10, wherein said drive means comprises a shaft for causing said two, substantially parallel transmission wires to pivot with respect to said housing, causing said food basket to move relative thereto.

12. The frying appliance in accordance with claim 11, wherein said drive means further comprises a drive motor operatively connected to said shaft for rotatively driving said shaft.

13. The frying appliance in accordance with claim 12, wherein said drive means further comprises a switch, a rotative cam that is rotatable with said shaft, and an electrical circuit for powering said drive motor, said cam actuating said switch to control said electrical circuit in order to feed power to said drive motor.

14. The frying appliance in accordance with claim 12, wherein said drive means is disposed in an offset position with respect to said oil bowl.

15. The frying appliance in accordance with claim 12, wherein said drive means is insulatively separated from said oil bowl.

16. The frying appliance in accordance with claim 13, wherein said electrical circuit further comprises a timer switch that continuously feeds power to said drive means, whereby said food basket cycles in and out of said oil bowl continuously for a predetermined time.

17. A frying appliance that comprises a food basket that is moveable between an upper, non-immersed, oil bowl position to a lower, immersed, oil bowl position, said frying appliance comprising:

a moveable food basket for receiving items to be fried;

a stationary oil bowl disposed adjacent said food basket, said oil bowl having means for receiving and heating oil for frying said items disposed in said food basket;

a translational mechanism connected to said food basket, said translational mechanism comprising a substantially parallel transmission wires for moving said food basket between an upper, non-immersed, oil bowl position to a lower, immersed, oil bowl position, wherein said items disposed in said food basket are cooked in heated oil disposed in said oil bowl, said translational mechanism allowing said food basket to remain substantially horizontal during said movement between its upper and lower positions; and drive means operatively connected to said translational mechanism for driving said translational mechanism between said upper, non-immersed, oil bowl pan position to said lower, immersed, oil bowl position.

18. The frying appliance in accordance with claim 17, further comprising a frame for supporting said oil bowl and said translational mechanism, said transmission wires being pivotally connected to said food basket and pivotally anchored to said frame.

19. The frying appliance in accordance with claim 18, wherein said drive means comprises a shaft for causing said transmission wires to pivot with respect to said housing, causing said food basket to move relative thereto.

20. The frying appliance in accordance with claim 18, wherein said drive means further comprises a drive motor operatively connected to said shaft for rotatively driving said shaft.

21. The frying appliance in accordance with claim 20, wherein said drive means further comprises a switch, a rotative cam that is rotatable with said shaft, and an electrical circuit for powering said drive motor, said cam actuating said switch to control said electrical circuit in order to feed power to said drive motor.

22. The frying appliance in accordance with claim 20, wherein said drive motor is disposed in an offset position with respect to said oil bowl.

23. The frying appliance in accordance with claim 20, wherein said drive motor is insulatively separated from said oil bowl.

24. The frying appliance in accordance with claim 21, wherein said electrical circuit further comprises a timer switch that feeds power to said drive means continuously, whereby said food basket cycles in and out of said oil bowl continuously for a predetermined time.

25. The frying appliance in accordance with claim 24, wherein, when said timer switch is closed, said food basket is lowered to said lower oil pan position.

26. The frying appliance in accordance with claim 24, wherein, when said timer switch is open, said food basket is raised to said upper oil pan position.

27. A uniform frying appliance that comprises a frying basket that uniformly fries food, and which contains less cooking oil, as it automatically moves between an upper, non-immersed, oil bowl position and a lower, immersed, oil bowl position, said frying appliance comprising:

a housing supporting a moveable food basket and a stationary oil bowl disposed adjacent said food basket, said oil bowl having means for receiving and heating oil for uniformly frying food disposed in said food basket;

a support mechanism connected to said frying basket for uniformly moving said food basket between an upper, non-immersed, oil bowl position to a lower, immersed, oil bowl position, said foods disposed in said food basket are uniformly cooked in heated oil disposed in said oil bowl by reason of said support mechanism allowing said food basket to remain substantially horizontal during said movement between said upper, non-immersed oil bowl position, and said lower, immersed oil bowl position; and a drive means operatively connected to said support mechanism for driving said support mechanism between said upper, non-immersed, oil bowl position to said lower, immersed, oil bowl position, said food being uniformly fried to provide a food product that retains less oil.

28. An intermittent frying appliance comprising a food basket that uniformly fries food, and which contains less cooking oil, as it automatically moves between an upper, non-immersed, oil bowl position and a lower, immersed, oil bowl position, said frying appliance comprising:

a housing supporting a moveable food basket and a stationary oil bowl disposed adjacent said food basket, said oil bowl having means for receiving and heating oil for intermittently frying food disposed in said food basket;

a support mechanism connected to said food basket for moving said food basket between an upper, non-immersed, oil bowl position to a lower, immersed, oil bowl position, said foods disposed in said food basket are uniformly cooked in heated oil disposed in said oil bowl by reason of said support mechanism allowing said food basket to remain substantially horizontal during said movement between said upper, non-immersed oil bowl position, and said lower, immersed oil bowl position; and drive means operatively connected to said support mechanism for automatically driving said support mechanism between said upper, non-immersed, oil bowl position to said lower, immersed, oil bowl position, said food being uniformly and intermittently fried to provide a food product that retains less oil.

* * * * *